Patented Apr. 3, 1951

2,547,274

UNITED STATES PATENT OFFICE 2,547,274

PARTIAL HYDROGENATION OF UNSATURATED CONJUNCT POLYMER HYDROCARBONS

Carl B. Linn, Riverside, Ill., assignor to Universal Oil Products Company, Chicago, Ill., a corporation of Delaware No Drawing. Application November 17, 1948, Serial No. 60,623

8 Claims. (Cl. 260—666)

This invention relates to a process for partially reducing the unsaturation of a mixture of polyolefinic, cyclic hydrocarbons formed in a conjunct polymerization reaction, particularly the conjugated unsaturation of said hydrocarbons, to thereby convert the same into a mixture of hydrocarbons more suitable for utilization as a drying oil in coating compositions etc. More specifically, the invention concerns a process for effecting partial hydrogenation of a mixture of polyolefinic, cyclic hydrocarbons to convert said hydrocarbons from a material having from about 2.5 to about 3.5 double bonds per molecule of which from about 50 to about 70% are in conjugated relationship to each other to a material more effective as a drying oil and containing apparently about 1 double bond per molecule.

It is one object of the present invention to provide a process for reducing the unsaturation of a mixture of polyolefinic, cyclic hydrocarbons formed in a conjunct polymerization reaction and recovered from the sludge product thereof. Another object of the invention is to improve the "drying" properties of a mixture of polyolefinic, cyclic hydrocarbons by eliminating or reducing the tendency of said hydrocarbons to form brittle, undesirably colored and friable protective coatings upon exposure of a thin film of the hydrocarbons to atmospheric oxygen in their original unmodified condition. Still another object of the process herein described is to provide a hydrocarbon drying oil which does not yellow upon standing and contains little of the objectionable coloring matter present in the unmodified mixture of polyolefinic, cyclic hydrocarbons as recovered from a sludge formed in a conjunct polymerization reaction.

In general the method of improving the drying characteristics of a hydrocarbon drying oil of a type comprising a mixture of polyolefinic cyclic hydrocarbons or unsaturated conjunct polymers by this invention comprises hydrogenating a mixture of said hydrocarbons recovered from a sludge formed in a conjunct polymerization reaction for a time and at such conditions that the resultant product contains approximately one double bond per molecule.

A more specific embodiment of the present invention relates to a process which comprises contacting a mixture of polyolefinic, cyclic hydrocarbons recovered from a sludge formed in a conjunct polymerization reaction and containing conjugated as well as isolated unsaturation with hydrogen in the presence of a catalyst comprising nickel supported on individual particles of a kieselguhr at a temperature of from about 30° to about 100° C. and at superatmospheric pressure for a time sufficient to reduce the number of olefinic linkages to approximately one bond per molecule.

Other objects and embodiments of the present invention relating to specific methods of conducting the present partial hydrogenation reaction and other aspects of the conversion will be hereinafter referred to in greater detail in the following further description of the invention.

It is generally recognized that certain unsaturated hydrocarbons of relatively high molecular weight and of specific structure when exposed in a thin film to atmospheric oxygen undergo what is generally considered to be a series of oxidation and polymerization reactions to form a hard, dry, somewhat elastic and tough film which provides a protective surface to the article to which the unsaturated hydrocarbon or drying oil is applied, the resulting dry film having properties similar to a protective coating formed when an unsaturated fatty acid glyceride drying oil is exposed to atmospheric oxygen under similar conditions. These hydrocarbons are consequently useful in the formulation of coating compositions such as paints and varnishes and the resulting products have been found to possess individual characteristics, such as resistance to aqueous and alkali media, and in fact, present distinguishing and practical differences over the fatty acid glyceride drying oil. One of the preferred sources of hydrocarbon type drying oils are certain catalysts-hydrocarbon sludges formed by or during the conjunct polymerization of unsaturated hydrocarbons under controlled reaction conditions. The drying oil hydrocarbons contained in the sludge formed as one of the products of the indicated conjunct polymerization reaction are recovered from the sludge by special methods of decomposing the catalyst-hydrocarbon addition complexes contained in the sludge whereby the highly unsaturated character of the recovered hydrocarbons is preserved. The hydrocarbon conjunct polymers as recovered from the sludge vary in molecular weight from as low as about 250 to as high as about 450, the highest boiling fractions of which have molecular weights as high as 1000, and contain from about 2.5 to about 4 double bonds per molecule of which an average of from about 1.5 to about 2.5 belong to a conjugated dienic system, remaining olefinic linkages being distributed throughout the hydrocarbon chain in isolated positions. Although unsaturation in the structure of these hydrocarbons is apparently essential to their ability to undergo oxidation and polymerization or "drying," the high degree of unsaturation in the unmodified conjunct polymer as recovered from the sludge is believed to be responsible for a certain degree of brittleness and friability of the dried or air exposed film of the latter drying oils. Among the natural glyceride drying oils, tung oil likewise contains a high degree of conjugated unsaturation and the undesirable gelling characteristic as well as the tendency of these oils to yellow on aging are believed to be the effect of the high degree of unsaturation, particularly conjugated unsaturation in the fatty acid portion of the glyceride esters comprising the latter oils. The process comprising the present invention has as its primary objective the treatment of either the full boiling range mixture of conjunct polymers, or alternatively, specific boiling fractions thereof to reduce the color of such oils and the tendency of the hydrocarbons to undergo additional coloring on aging or upon exposure to atmospheric oxygen, during the so-called "drying" process. Another objective of the present invention is to provide a means for substantially eliminating the tendency of conjunct polymer hydrocarbon drying oils to form brittle, friable films upon exposure to atmospheric oxygen or "drying." When the present product, comprising a partially hydrogenated mixture of conjunct polymers is intended for drying oil purposes, hydrogenation of the original charge of conjunct polymers is desirably terminated short a complete hydrogenation and preferably at least one double bond per molecule of the original conjunct polymer unsaturation is retained in the final product, since the ability of the partially hydrogenated material to undergo drying upon exposure to atmospheric oxygen is apparently dependent upon at least a critical proportion of the carbon-to-carbon linkages comprising the structure of the hydrocarbon molecular being doubly bonded.

Various analytical studies on the molecular structure and composition of the conjunct polymer charging stock utilized in the present process, for example, physical data based upon ultraviolet and infra-red adsorption spectre, have indicated that the mixture of conjunct polymers contains hydrocarbons of the following general types of structure and homologs thereof:

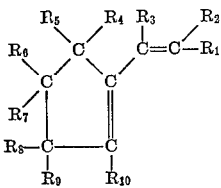

and

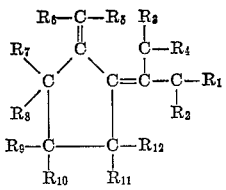

where the radicals $R_2$ to $R_{12}$ are selected from the group consisting of hydrogen and alkyl, alkenyl, alkapolyenyl hydrocarbon radicals, at least two of the substituents $R_4$ to $R_{10}$ are hydrocarbon radicals, not more than two of the group $R_1$, $R_2$, $R_3$, $R_{10}$, $R_{11}$ and $R_{12}$ represent hydrogen and the group $R_1$ in the hydrocarbon compound represents an unsaturated hydrocarbon radical. It is found that upon partial hydrogenation of compounds of the above structure in accordance with the present process, that is, in the presence of water and/or an organic peroxide compound, the bromine number of the final product is generally equal to and in many cases exceeds the bromine number of the charging stock, in spite of the fact that at least one mole of hydrogen is absorbed by the hydrocarbon reactants during the hydrogenation. One possible explanation of this behavior, which however is not intended to limit the scope of the present process in accordance with such explanation, is that the highly substituted pentamethylene ring with two conjugated double bonds accepts one molecule of hydrogen to form a mono-olefin in which the double bond is completely substituted by carbon atoms. Since this product has the same bromine number as the original conjunct polymer mixture, in spite of possessing only half of its unsaturation, it is reasonable to presume that there are present two active hydrogens in the structure of the resulting partially hydrogenated molecule which react with bromine by substitution. In both of the above proposed structures of the conjunct polymer hydrocarbon molecule, hydrogen adding 1–4 to the conjugated system forms a double bond which is completely substituted. The above represents but one, although perhaps the most logical, explanations of the anomalous behavior of the conjunct polymers upon partial hydrogenation.

The polyolefinic, cyclic hydrocarbons or conjunct polymers employed as charging stock herein is a mixture of hydrocarbons formed by means of a process known in the art as a conjunct polymerization type of reaction. Certain classes of hydrocarbons, generally characterized as unsaturated, and preferably of non-aromatic structure, when contacted with a catalyst of the acid-acting type at selected reaction conditions undergo conjunct polymerization to form a sludge-like product containing loosely bound complex addition compounds of the catalyst in said conjunct hydrocarbon polymer. The latter mixture of hydrocarbons which are retained in the sludge by loose chemical bonds with the acid-acting catalyst may be recovered therefrom, free of the catalyst, by special methods of decomposition hereinafter referred to.

The properties of the ultimately recovered polyolefinic, cyclic hydrocarbons or conjunct polymers depend to some extent upon the type of hydrocarbon employed in the sludge-forming or conjunct polymerization reaction. Suitable hydrocarbon starting materials comprise, in general, unsaturated hydrocarbons containing at least three carbon atoms per molecule such as mono-olefins, poly-olefins and/or acetylenic hydrocarbons of either branched or straight chain structure. Cyclic olefins and isoparaffins may also be employed as charging stock to the conjunct polymerization reaction, either individually or in admixture with, for example, mono- or poly-olefins. A mixture of the various classes of hydrocarbons specified above may be utilized in preparation of the sludge, the proportion of aromatic hydrocarbons in the mixture desirably being small or preferably nil, since the latter hydrocarbons tend to reduce the yield and quality of the ultimately formed sludge. An especially preferred charging stock from the standpoint of availability and desirability in producing a sludge in high yields is a hydrocarbon fraction containing components from hexene to dodecene in molecular weight, or an octene fraction of a selective or a non-selective polymer gasoline (prepared by the co-polymerization of various butylenes and/or propylene). Other suitable hydrocarbon charging stocks in the preparation of the present conjunct polymer hydrocarbon product are the various fractions of thermally cracked gasoline which have been reduced in aromatic content, for example, by extraction, to render the same useful as charging stock in the present process.

The conjunct polymerization catalyst which when contacted with the hydrocarbon charging stock of the above specifications yields a sludge containing complex addition products of the catalyst with the unsaturated conjunct polymers formed in the reaction are generally characterized as acid-acting catalysts and are generally charged to the conjunct polymerization reaction in an anhydrous condition. The catalysts utilizable in the process include certain members of the anhydrous Friedel-Crafts metal halides and certain inorganic acids. Anhydrous aluminum chloride and aluminum bromide, either individually or in the presence of a promoter comprising hydrogen chloride or hydrogen bromide, are capable of effecting conjunct polymerization of the unsaturated hydrocarbon charging stock. Of the inorganic mineral acids utilizable as catalysts, sulfuric acid having a concentration usually above about 85%, and preferably from about 95 to about 100% concentration and hydrofluoric acid containing less than about 10% of water (preferably the substantially anhydrous reagent) comprise another group of the generally broad class of acid-acting catalysts utilizable to effect conjunct polymerization of the hydrocarbon charging stock.

On contacting the hydrocarbons and conjunct polymerization catalyst at reaction conditions specified, generally, as "sludge-forming" or conjunct polymerization reaction conditions, the catalyst in the initial stages of the reaction acts catalytically in effecting polymerization, cyclization, and hydrogen transfer between the charged hydrocarbon reactants to form high molecular weight, cyclic hydrocarbon compounds, some of which are saturated and some poly-unsaturated, the unsaturated hydrocarbons having the structure hereinabove proposed. The poly-unsaturated hydrocarbons combine with the catalyst in definite molecular proportions to form a catalyst-polyolefinic hydrocarbon addition complex comprising the sludge. The latter is a relatively non-viscous liquid product of the reaction containing definite chemical compounds of the addition complex type, but containing substantially no compounds having organically bound anionic catalyst groups such as fluorine, chlorine or sulfate radicals.

The saturated hydrocarbon components of the product, which separate from the sludge as an individual phase have a structure similar to the unsaturated components bound to the catalyst as the sludge, except for the carbon/hydrogen ratio in their composition; their formation is accounted for as the result of the hydrogen transfer reactions occurring during the conjunct polymerization reaction. The latter, saturated conjunct polymers generally comprise both open chain and cyclic hydrocarbons.

The sludge-forming or conjunct polymerization reaction involved in the preparation of the present charging stock is effected by contacting the hydrocarbon starting material of the aforementioned composition, preferably an olefinic charging stock composed of olefins having at least three carbon atoms per molecule, with the conjunct polymerization catalyst at temperatures within the range of from about 0° to about 200° C., preferably from about 30° to about 125° C. and at a superatmospheric pressure sufficient to maintain the reactants in substantially liquid phase. Observation has shown that substantially anhydrous hydrofluoric acid having a concentration greater than about 95% is the preferred conjunct polymerization catalyst, not only on the basis of superior yields and quality of the hydrocarbon product recoverable from the sludge, but also from the standpoint of certain operating advantages, especially in the sludge decomposition stage where thermal methods of decomposition may be employed, making it possible to recover, for recycling purposes, a hydrogen fluoride effluent phase containing from about 98 to about 100% anhydrous hydrogen fluoride. An optimum yield of sludge is obtained when the weight ratio of olefins to conjunct polymerization catalyst charged to the reaction zone is maintained within the range of from about 1.2 to about 3.5, preferably from about 1.7 to about 2.5.

At the above conjunct polymerization reaction conditions and when the reaction mixture of hydrocarbons and catalyst is mixed by some form of stirring device, sludge formation takes place rapidly, although the reaction may be allowed to continue for one or more hours to obtain maximum production of the sludge. The liquid catalyst phase and the upper layer saturated hydrocarbon phase, formed upon completion of the reaction, separate on standing and the separate phases may be recovered, for example, by decantation.

The conjunct polymers or polyolefinic, cyclic hydrocarbon mixture may be recovered from the sludge by any suitable method, depending upon the catalyst utilized in the formation of the sludge, although certain procedures provide advantages in operation which are not common to the other presently known methods of sludge decomposition. One of such methods, applicable to any of the conjunct polymerization catalyst sludges hereinabove referred to, results in the production of a highly unsaturated hydrocarbon product, but reduces the concentration or chemical structure of the catalyst such that it cannot be readily or economically recovered for recycling purposes to the sludge-forming stage of the process. This method, which consists in hydrolyzing the sludge in an aqueous medium, is effected by thoroughly mixing the sludge with water or a dilute alkali solution. During the hydrolysis, the unsaturated conjunct polymer hydrocarbons associated with the catalyst in the sludge form a separate phase and rise to the top of the mixture, while the water-soluble catalyst enters the aqueous phase. Attending the high cost of the recovery procedure for reconcentrating the acid, these methods require the use of acid-resistant equipment, not only in effecting the aqueous hydrolysis, but also in distilling the aqueous catalyst for reconcentrating the same to the anhydrous or nearly anhydrous condition required for use as recycled catalyst in the conjunct polymerization reaction.

The necessity of recovering the conjunct polymerization catalyst in a nearly anhydrous condition by means of an inexpensive procedure constitutes one of the chief advantages in the use of hydrogen fluoride as catalyst, since the latter catalyst may be vaporized from the sludge, cooled and reliquefied for recycling purposes. The decomposition of the sludge may thus be effected by merely heating the sludge until the hydrogen fluoride component thereof is removed by vaporization, leaving a hydrocarbonaceous residue in which the residual component hydrocarbons contain more or less conjugated unsaturation, depending upon the conditions utilized. The latter simple thermal decomposition method, however, as may be expected from the known condensing activity or free hydrogen fluoride, yields an inferior hydrocarbon product containing few, if any, conjugated or non-conjugated unsaturated bonds, due to the interpolymerization and condensation of the unsaturated hydrocarbons; a large proportion of the product, in fact, may consist of tarry or highly colored condensation products. The simple thermal decomposition method of treating the sludge, however, may be modified to obviate many of these disadvantages. Such modified procedures involve decomposing the sludge in the presence of a sludge decomposition catalyst or in the presence of an inert diluent which dissolves the liberated sludge hydrocarbons immediately upon decomposition and removes them from contact with the free hydrogen fluoride, also liberated from the sludge upon thermal decomposition. In the catalytic decomposition method the hydrogen fluoride sludge at a temperature of from about 50° to about 250° C. is charged into a reactor column packed with catalytic material which enhances the decomposition of the sludge but retards the cracking and polymerization of the conjunct polymers released therefrom. The hydrogen fluoride vapors, having a purity of from about 98 to 100% hydrogen fluoride, depending upon the temperature of operation, are taken overhead to auxiliary coolers, while the higher boiling conjunct polymer hydrocarbons are removed from the catalytic decomposition column as a bottoms fraction. The effective catalysts utilizable as packing materials in the catalytic decomposition column comprise certain metals which are resistant to corrosion by free hydrogen fluoride, graphitic carbon and metallic fluoride or oxyfluoride salts. Among the preferred catalysts for effecting the decomposition, lead, copper and cobalt as well as certain brasses containing copper, lead and tin have been found to be some of the most effective in obtaining decomposition of the sludge and recovery of the hydrocarbon product in a condition in which the components contain conjugated as well as non-conjugated unsaturation.

In the thermal decomposition method involving decomposition of the hydrogen fluoride sludge by charging the same into a liquid pool of inert diluent, the temperature of the diluent is maintained sufficiently high that the hydrogen fluoride released upon decomposition of the sludge is immediately vaporized and separated from the liquid hydrocarbon phase in the reactor. The temperature maintained in the reactor is, on the other hand, sufficiently below the boiling point of the conjunct polymer hydrocarbon product that very few of the lighter hydrocarbon components thereof are flashed into the hydrogen fluoride vapor outlet. Suitable inert liquids into which the hydrogen fluoride sludge is charged may be a hydrocarbon or mixture of hydrocarbons such as a paraffin or a naphtha having a boiling point from about 50° to about 180° C., preferably from about 110° to about 140° C. Such hydrocarbons include the octanes, nonanes, decanes or mixtures thereof, such as a fraction of a straight run gasoline boiling in the above range, di-ethylcyclohexane, tri-methylcyclohexane, etc. The heat of vaporization of the hydrogen fluoride and the heat of decomposition of the sludge complexes may be supplied to the decomposition zone by maintaining the inert liquid diluent under reflux and allowing the hydrogen fluoride sludge to come into direct contact with the hot vapors from the reboiling section. The mixture of diluent and polyolefinic, cyclic hydrocarbons separated by decomposition of the hydrogen fluoride sludge accumulate as a mixture in the reboiler section from which the diluent is vaporized to serve its purpose in the upper decomposition zone of the column. In order to recover the desired conjunct polymers or polyolefinic, cyclic hydrocarbons from the mixture in the reboiler section, the mixture may be subjected to a fractional distillation, preferably at a subatmospheric pressure to reduce the boiling point thereof, and specific boiling point fractions thereof separated as desired. Prior to the latter fractional distillation, the mixture of diluent and polyolefinic, cyclic hydrocarbons may be washed with a suitable caustic solution to remove entrained and/or dissolved hydrogen fluoride which would adversely affect the quality and color of the polyolefinic, cyclic hydrocarbons if allowed to remain therein when distilled.

Partial hydrogenation of the mixture of polyolefinic, cyclic hydrocarbons or conjunct polymers prepared as hereinabove described and comprising the charging stock in the present process is effected in accordance with said process by contacting said hydrocarbon mixture with hydrogen in the presence of a suitable hydrogenation catalyst at temperature and pressure conditions sufficient to effect said partial hydrogenation, generally to such an extent that from about 0.5 to about 2.0 moles of hydrogen are consumed per mole of conjunct polymers (based upon the average molecular weight thereof) charged to the reaction. Where a hydrocarbon drying oil is desired as the ultimate product of the present process, it is important that the extent of hydrogenation be carefully controlled until the proper reduction in the unsaturation of the charging stock is obtained, corresponding to a product which on the basis of a previously prepared similar product, demonstrates the desired drying qualities, usually a product containing at least one, but preferably not more than two double bonds per molecule thereof.

Partial hydrogenation is effected by contacting the mixture of conjunct polymer hydrocarbons with hydrogen at temperatures of from about 0° to about 150° C., at superatmospheric pressures, usually of from about 5 to about 100 atmospheres, preferably from about 10 to about 40 atmospheres and in the presence of a solid contact agent which catalyzes the addition of hydrogen to the unsaturated linkages of the polyolefinic hydrocarbons comprising the mixture of conjunct polymers in the charging stock. In the selection of charging stock, the entire mixture of hydrocarbon conjunct polymers recovered from the sludge formed in a conjunct polymerization reaction having a boiling point range of from about 150° to above 450° C. may be subjected to hydrogenation, or selected fractions thereof, for example, a fraction boiling from about 200° to about 300° C., especially desirable as a drying oil because of the absence therefrom of the volatile, low molecular weight components of the hydrocarbon mixture, may be utilized as charging stock. The hydrogenation is effected by any means suitable to obtain intimate contact of the gaseous hydrogen phase with the liquid hydrocarbon phase in the presence of the solid hydrogenation catalyst. For this purpose, the catalyst may be in a finely divided suspension in the hydrocarbon phase and may be maintained in suspension by a suitable stirring arrangement or device such as a rotating autoclave which is rotated or shaken at a rate sufficient to uniformly disperse the catalyst particles throughout the reaction mixture. Another suitable apparatus for effecting intimate contact of the gaseous hydrogen phase with the catalyst-hydrocarbon suspension is provided by bubbling a stream of hydrogen gas into a container, such as a vertical column filled with said catalyst and conjunct hydrocarbon polymer suspension. Contact between the respective gaseous and liquid phases may be effected countercurrently by introducing the gaseous stream of hydrogen into the bottom of the column and liquid hydrocarbons in the top thereof, withdrawing partially hydrogenated conjunct polymers from the bottom of the column, and unabsorbed hydrogen from the top thereof and recycling the effluent streams, if desired. In the latter arrangement, it is usually preferable to provide a fixed bed of the hydrogenation catalyst in the hydrogenating column, or introducing a suspension of the finely divided catalyst and conjunct polymer hydrocarbons into the top of the column, maintaining the catalyst in suspension by the ebullient effect of the hydrogen gas introduced into the bottom of the column of liquid hydrocarbons through which the gas rises by virtue of its lesser density. In some instances, to obtain more rigid control of the degree of hydrogenation and thereby prevent more extensive hydrogenation than desired, the conjunct polymer charging stock may be dissolved in an inert diluent thereof, such as a paraffinic hydrocarbon or a halogenated hydrocarbon analog thereof. Suitable inert diluents include such hydrocarbons as hexane, heptane, octane, etc. or a mixture thereof such as a straight run gasoline fraction. Other suitable diluents include the naphthenes, such as cyclohexane, ethylcyclohexane, etc. and the halogenated hydrocarbon analogs such as trichloropentane, hexachlorocyclohexane, perfluorocyclohexane, etc.

Hydrogenation catalysts suitable in the present process preferably comprise the catalysts of relatively mild hydrogenating activity such as metallic sulfide and metallic oxide catalysts of such metals as nickel, cobalt, tungsten and molybdenum and the chromite salts of such metals as nickel, cobalt, copper, zinc, etc., either as the individual salts or preferably supported on a suitable inert material, such as alumina, charcoal, kieselguhr, silica, powdered pumice, asbestos, etc. More active hydrogenation catalysts may also be employed in the present process, especially when the mixture of conjunct polymers comprising the present charging stock herein is diluted with the above referred to inert diluent and when relatively low temperatures and high relative space velocities or flow rates are employed in the hydrogenation reaction. Of the latter, such catalysts as platinum and palladium, their oxides or sulfides, preferably deposited upon an inert carrier of the type hereinabove mentioned and metallic nickel, cobalt and/or thorium in the form of their reduced metal oxides or as the oxides themselves which may be deposited on a carrier, preferably in a colloidal condition are particularly desirable, the supported nickel and/or cobalt composites being especially suitable herein as having the desired degree of activity and in effecting the desired reduction in the unsaturation of the conjunct polymer charging stock at controlled reaction conditions. The latter catalyst composites are prepared, for example, by reducing nickel or cobalt oxide precipitated on a kieselguhr support containing from about 0.5 to about 5% by weight of the metal. The catalyst support or carrier is impregnated in an initial step of the process with an aqueous solution of a nickel and/or cobalt salt followed by the addition of a suitable basic reagent to the mixture, such as ammonium hydroxide, which precipitates the nickel and/or cobalt oxide on the support, the latter metal oxide-kieselguhr composite being recovered, dried and heated in an atmosphere of hydrogen to reduce the metal oxide to the corresponding metallic state. The water and/or organic peroxide addendum to the present reaction mixture tends to reduce the activity of the catalyst and when active catalysts are utilized, it becomes especially desirable to incorporate said addendum in the reaction mixture to obtain the results herein provided. It is not intended to infer from the enumeration of the above hydrogenation catalysts utilizable in the present process that all of said catalysts are of equivalent effectiveness; rather the preferred members of the group are those having a relatively low rated hydrogenating activity, but having sufficient effect to saturate at least a portion of the olefinic double bonds in the molecular structure of the hydrocarbon charging stock without reducing the bromine number thereof to zero.

The formation of a product consisting of a partially hydrogenated polyolefinic, cyclic hydrocarbon having the same or substantially similar bromine number as that of the charging stock is enhanced by the presence of water and/or peroxidic organic compounds in the reaction mixture, such as di-tertiarybutylperoxide, benzoyl peroxide and other pure peroxidic compounds or a mixture of organic peroxides formed upon oxidation of hydrocarbons in the presence of oxygen or ozone. A particularly desirable source of peroxidic oxygen is the peroxide compounds formed on the oxidation of a mixture of conjunct polymer hydrocarbons reacted with oxygen or air at a relatively low temperature sufficient to absorb approximately one molecular proportion of oxygen per mole of hydrocarbons charged. The quantity of peroxide added to the reaction mixture may be less or in substantially the same molecular proportion as the amount of conjunct polymer charging stock, usually within the range of from about 0.1 to about one molecular proportion, depending upon the degree of hydrogenation desired in the finished product. Water is desirably present in the reaction mixture whether or not a peroxidic compound is introduced in the charging stock subjected to hydrogenation, the water being supplied in admixture with the charging stock, or, alternatively, by periodically hydrating the catalyst by steaming or otherwise. When included in the charging stock, the amount of water introduced to the reaction zone is preferably from about 0.1% to about 10% by weight of said charging stock. The partially hydrogenated product resulting from the present hydrogenation reaction in the presence of a peroxidic compound or in the presence of water has substantially the same bromine number as the original charging stock by virtue of the fact that the hydrogen introduced into the reaction mixture is presumed to add 1, 4 to the dienic system of double bonds contained in the hydrocarbons comprising the charging stock, thereby forming a pair of di-hydrogen substituted carbon atoms and leaving a pair of carbon atoms linked by a double bond which activates the two hydrogen atom substituents thereon such that the resulting product containing one olefinic double bond, but two activated hydrogen atoms reacts with approximately the same quantity of bromine as the original charging stock containing the two dienic double bonds. The process thus enables the production of modified hydrocarbon drying oils which produce substantially improved films upon drying when exposed to atmospheric oxygen because of the fewer unsaturated bonds particularly, conjugated double bonds in the molecular structure of the component hydrocarbons which are believed to be at least one factor in forming brittle and/or highly colored films upon drying the unmodified conjunct polymers. The activated hydrogen atoms of the partially hydrogenated product account for the ability of the product to be utilized as a valuable intermediate for the production of other derivatives thereof by synthesis, for example, by replacing the activated hydrogen atoms by hydroxyl groups in accordance with a typical reaction mechanism, such as the following:

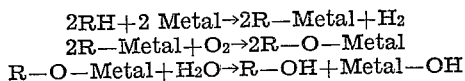

2RH+2 Metal→2R—Metal+H$_2$
2R—Metal+O$_2$→2R—O—Metal
R—O—Metal+H$_2$O→R—OH+Metal—OH The product is especially susceptible to oxidation by air, oxygen, or aqueous oxidizing agents to form valuable alcohols, ketones, aldehydes and peroxides. The present partially hydrogenated product may be subjected to oxidation, for example, by bubbling air or pure oxygen into a mass of the material at a suitable reaction temperature, usually from about 0° to about 60° C., to form a product which tends to set rapidly on exposure to atmospheric oxygen to a "dry" film, the resulting oxidized material, in effect, completes the "drying" process in a shorter period of exposure. It is considered operable in the present process to subject the mixture of conjunct polymers or polyolefinic, cyclic charging stock to oxidation prior to the hydrogenation treatment herein provided and thereby produce a drying oil product possessing a further and in other respects, distinctive, modification in the drying properties thereof.

The operating procedure, reactants and other variables of the present process are further illustrated in the following examples, which, however, are not intended to limit the scope of the present process in accordance with the conditions specified therein.

*Example I.*—A mixture of polyolefinic, cyclic hydrocarbons or conjunct polymers was prepared by the reaction of a mixture of mono-olefinic hydrocarbons with liquefied hydrogen fluoride containing less than 1% water to form a hydrogen fluoride-hydrocarbon sludge phase and a relatively saturated, upper layer, hydrocarbon phase. The conjunct polymers were recovered from the sludge phase by the hydrolytic method for decomposing the catalyst-hydrocarbon sludge complexes. The latter conjunct polymer hydrocarbons in their as-recovered, unmodified condition dry on exposure to air to form a tan-colored friable, brittle film which has little resistance to abrasion.

22 liters (16.5 kg.) of a non-selective copolymer having a bromine number of 116 and consisting of the copolymers of mixed butylene and propylene containing from about 8 to about 12 carbon atoms per molecule was charged into a pressure autoclave and rapidly stirred as 9.0 kg. of liquid hydrogen fluoride was introduced into the reactor. The pressure was maintained throughout the reaction at an average value of about 205 pounds per square inch by means of compressed nitrogen. The temperature was thereafter increased to 90° C. and stirring was continued for an additional one hour. The reaction mixture separated into two phases on standing: an upper saturated hydrocarbon layer and a lower acidic layer containing substantially all of the hydrogen fluoride charged into the reaction. The desired lower acidic sludge layer weighed 16.1 kg. and consisted of a light brown mobile fluid having a density of 0.98 at 4° C.

5 kilograms of the above hydrogen fluoride sludge was allowed to flow into a mixture of ice and water, additional ice being added as the heat of reaction melted the ice in the resulting hydrolytic reaction. 2.17 kg. of a light-colored, sweet-smelling oil separated from the aqueous phase, a yield of 42.2% bases on the weight of the original olefins charged. An examination of the oil indicated the following properties:

| | |
|---|---|
| Boiling range | 160° to over 400° C. |
| Density, D$_4^{20}$ | 0.863 |
| Refractive index, $n_D^{20}$ | 1.4871 |
| Color, Gardner | 12–13 |
| Average molecular weight | 300 |
| Diene number | 85 |
| Bromine number | 195 |
| Double bonds per molecule (average) | 3.2 |

Although the above mixture of conjunct polymers was prepared from a hydrogen sludge and was recovered therefrom by an aqueous hydrolysis procedure, a similar material may be obtained from an aluminum chloride or sulfuric acid sludge, and the conjunct hydrocarbon polymers may be also recovered from the hydrogen fluoride sludge by thermally decomposing the catalyst-hydrocarbon complexes contained therein.

16.6 grams of a fraction boiling from about 190° to about 200° C., corresponding to hydrocarbons having the approximate formula: C$_{12}$H$_{22}$, separated from the full boiling range mixture of conjunct polymers hereinabove specified was dissolved in 10 cc. of pentane solvent and charged, together with 5 grams of water into an 850 cc. pressure autoclave containing 5 grams of nickel catalysts supported on kieselguhr. Hydrogen at an initial pressure of 100 atmospheres was charged into the pressure autoclave and the mixture therein heated to a temperature of 100° C. The autoclave at the above temperature was slowly rotated for a period of four hours when the contents of the reactor were cooled, subsequently emptied, and the product examined. Approximately 1.4 molar proportions of hydrogen was consumed, based upon the hydrogen remaining in the autoclave. The following table presents data obtained on the product as compared with similar physical constants determined on the unmodified charging stock:

*Table I*

|  | Charging Stock, 190°–200° C. Fraction of the Conjunct Polymer | Partial Hydrogenation Product |
|---|---|---|
| Refractive Index, $n_D^{20}$ | 1.4747 | 1.4518 |
| Bromine Number | 222 | 217 |
| Diene Number | 85 | <1 |
| Molecular Weight | 167 | 167 |
| Elementary Analysis: |  |  |
| Carbon, per cent | 86.15 | 85.76 |
| Hydrogen, per cent | 12.25 | 13.33 |
| Ultraviolet Analysis: |  |  |
| $\lambda_{max}$ | 243 | No 240–250 band |
| $E_{max}$ | 43.4 |  |

The product when spread as a thin film on a test panel and exposed to atmospheric oxygen for several days dried to a tough adherent film as compared to a brittle, friable and flaky film obtained upon testing the original charging stock in a similar manner.

*Example II.*—To show the effect of water in the charging stock on the bromine number of the hydrogenated conjunct polymers, where the hydrogenation is effected under otherwise similar conditions, except for the absence of said water and/or peroxides in the charging stock, the following experiment was made in which a dry mixture of conjunct polymers separated from the same source as the charging stock of Example I was contacted under similar reaction conditions in the presence of a similar sample of fresh nickel hydrogenation catalyst.

16.6 grams of the 190–200° C. fraction of the mixture of polyolefinic, cyclic hydrocarbons prepared as in Example I and 10 cc. of pentane solvent were charged into a 850 cc. hydrogenation autoclave containing 5 grams of finely divided nickel catalyst supported on kieselguhr and the mixture heated at 100° C. for four hours in the presence of hydrogen at 100 atmospheres pressure. The hydrogen absorbed was approximately 2.0 moles per mole of conjunct polymer charged (average molecular weight of which was approximately 167), calculated from the hydrogen residue remaining in the autoclave. The physical data determined by analysis of the product are tabulated below in Table II and comparison may be made therein with the unmodified charging stock in the column designated as such:

*Table II*

|  | Conjunct Polymer Charging Stock (190–200° C. fraction of the Full-Boiling Range Mixture) | Completely Hydrogenated Conjunct Polymer Product |
|---|---|---|
| Refractive Index, $n_D^{20}$ | 1.4747 | 1.4400 |
| Bromine Number | 222 | <1 |
| Diene Number | 85 | <1 |
| Molecular Weight, Average | 167 | 167 |
| Elementary Analysis: |  |  |
| Carbon, per cent | 86.15 | 85.28 |
| Hydrogen, per cent | 12.25 | 14.56 |

The results of hydrogenation of identical charges of conjunct polymers at similar reaction conditions, except for the absence of water in the charging stock (Example I vs. Example II) indicates that the bromide number of the conjunct polymers fraction is reduced to substantially nil, whereas, the product formed in the presence of water, as in Example I, has a bromine number practically identical with the charging stock. A comparison of the quantity of hydrogen consumed indicates that slightly less hydrogen was absorbed in the former reaction than in the present one (approximately 1.4 moles per mole of hydrocarbon as compared to 2.0).

*Example III.*—The following experiment indicates that substantially the same product as Example II prepared by partial hydrogenation of the conjunct polymer fraction in the absence of water may be obtained by further hydrogenating the product of Example I prepared in the presence of water and having substantially the same bromine number as the original charging stock.

8.1 grams of the partially hydrogenated 190–200° C. fraction of Example I and 20 cc. of pentane solvent were charged into an 850 cc. hydrogenation autoclave containing 5 grams of finely divided nickel catalyst supported on kieselguhr and the mixture heated at 100° C. for 6 hours in the presence of hydrogen at 100 atmospheres pressure. No water was added to the reaction mixture. The hydrogen absorbed was approximately 1.5 moles per mole of charging stock, calculated from the hydrogen residue remaining in the autoclave. The physical data determined by analysis of the product are tabulated below and comparison may be made with the unmodified charging stock and the partial hydrogenation product prepared as in Example I comprising the charging stock in the present example.

*Table III*

|  | Original Charging Stock, the 190–200° C. Fraction of the Full Boiling Mixture of Conjunct Polymers | The Completely Hydrogenated Product of Example II | The Completely Hydrogenated Product formed by Hydrogenating the Product of Example I |
|---|---|---|---|
| Refractive Index, $n_D^{20}$ | 1.4747 | 1.4400 | 1.4397 |
| Bromine Number | 222 | <1 | <1 |
| Diene Number | 85 | <1 | <1 |
| Molecular Weight | 167 | 166 | 163 |
| Elementary Analysis: |  |  |  |
| Carbon, per cent | 86.15 | 85.28 | 85.30 |
| Hydrogen, per cent | 12.25 | 14.56 | 14.55 |

*Example IV.*—In this experiment a fraction boiling from 247 to 264° C. of the original full-boiling range conjunct polymer hydrocarbons was utilized to effect partial hydrogenation in the presence of water to determine the effect of partial hydrogenation on the color of the fraction. The unhydrogenated fraction possesses a somewhat yellow color which is considered undesirable in the formulation of paint and varnish compositions.

21.2 grams of the 247-264° C. fraction of the mixture of polyolefinic, cyclic hydrocarbons prepared as in Example I dissolved in 140 cc. of pentane solvent was charged together with 5 grams of water into an 850 cc. hydrogenation autoclave containing 5 grams of finely divided nickel catalyst supported on particles of kieselguhr and the mixture heated at 100° C. for 4 hours in the presence of hydrogen at 100 atmospheres pressure. The hydrogen absorbed was approximately 1.7 moles per mole of conjunct polymer charged (average molecular weight of about 214), calculated from the hydrogen residue remaining in the autoclave. The physical data determined by analysis of the product are tabulated below in Table IV and comparison of the corresponding physical constants may be made with the unmodified charging stock.

Table IV

| | Charging Stock, the 247-264° C. Fraction of the Full-Boiling Mixture of Conjunct Polymers | Partially Hydrogenated Conjunct Polymer Fraction, B. P. 247-264° C. |
|---|---|---|
| Refractive Index, $n_D^{20}$ | 1.4842 | 1.4683 |
| Bromine Number | 220 | 223 |
| Diene Number | 71 | <1 |
| Elementary Analysis: | | |
| Carbon, per cent | 86.41 | 86.84 |
| Hydrogen, per cent | 12.50 | 13.28 |
| Ultraviolet Analysis | | (¹) |
| $\lambda_{max}$ | 245 | 246 |
| $E_{max}$ | 46.8 | 12.9 |

¹ The ultraviolet spectrum was entirely dissimilar to the original conjunct polymer fraction or charging stock.

Results of the partial hydrogenation of the 247-264° C. fraction of the full-boiling mixture of conjunct polymer hydrocarbons in the presence of water indicate that the original, somewhat yellow color was eliminated and a practically water-white product resulted. When the resulting product was spread in a thin film on a test panel and exposed to atmospheric oxygen, the film dried to a hard, tough, abrasion-resistant film which was practically colorless after completion of the drying period. The bromine number of the partially hydrogenated product was substantially similar to that of the original charging stock (223 as compared to 220).

*Example V.*—The following experiment was made to determine the effect of organic peroxidic compounds on the hydrogenation of the conjunct polymer fraction having a boiling point of from about 180° to about 225° C. in the presence of an inert diluent comprising normal pentane.

16.5 grams of the 180-225° C. fraction of the mixture of conjunct polymers prepared as in Example I, said fraction containing hydrocarbons having an approximate average molecular weight of 164 and an empirical formula corresponding to $C_{12}H_{22}$ was dissolved in 20 cc. of normal pentane solvent and charged into a hydrogenation autoclave having a capacity of 128 cc. and containing 5 grams of finely divided nickel catalyst supported on kieselguhr. To the above mixture was added an amount of ditertiarybutylperoxide approximately equal to one molecular equivalent of the conjunct polymer hydrocarbons, or 14.6 grams, and the resulting mixture heated at 25° C. for four hours in the presence of hydrogen at 100 atmospheres pressure. The amount of hydrogen absorbed based upon the hydrogen residue remaining in the autoclave was approximately 2.2 moles per mole of conjunct polymer charged. The physical data determined by analysis are tabulated below in Table V and comparison may be made of the product with the original charging stock tabulated in the column designated as such.

Table V

| | Charging Stock, Conjunct Polymer Fraction, B. P. 180-225° C. | Partially Hydrogenated Product |
|---|---|---|
| Refractive Index $n_D^{20}$ | 1.4784 | 1.4537 |
| Bromine Number | 196 | 194 |
| Diene Number | 87 | <1 |

The results of the partial hydrogenation of the charged fraction of conjunct polymers indicates an effect thereon similar to the presence of water in the reaction mixture; that is, the bromine number of the resulting product is approximately equal to the bromine number of the conjunct polymer fraction charged to the hydrogenation reaction. The product was almost water-white as compared to the somewhat yellow color of the hydrocarbon mixture utilized as charging stock.

I claim as my invention:

1. A process for improving the drying properties of a conjunct polymer mixture of polyolefinic, cyclic hydrocarbons having from about 2.5 to about 4 double bonds per molecule and containing conjugated and isolated unsaturation, which comprises reacting said mixture with hydrogen in the presence of a hydrogenation catalyst and controlling the hydrogenation to reduce the number of said double bonds to approximately one per molecule.

2. A process for improving the drying properties of a conjunct polymer mixture of polyolefinic, cyclic hydrocarbons having from about 2.5 to about 4 double bonds per molecule and containing conjugated and isolated unsaturation, which comprises reducing the number of said double bonds to approximately one per molecule by reacting the mixture of conjunct polymers with from about 0.5 to about 2.0 moles of hydrogen per mole of conjunct polymers, based on the average molecular weight of said polymers, in the presence of a hydrogenation catalyst and at a temperature of from about 0° C. to about 150° C. and a pressure of from about 5 to about 100 atmospheres.

3. The process of claim 1 further characterized in that the conjunct polymer mixture is reacted with hydrogen in the presence of water.

4. The process of claim 1 further characterized in that the conjunct polymer mixture is reacted with hydrogen in the presence of an organic peroxidic compound.

5. The process of claim 1 further characterized in that the conjunct polymer mixture is reacted with hydrogen in the presence of water and an organic peroxidic compound.

6. The process of claim 2 further characterized in that the conjunct polymer mixture is reacted with hydrogen in the presence of water.

7. The process of claim 2 further characterized in that the conjunct polymer mixture is reacted with hydrogen in the presence of an organic peroxidic compound.

8. The process of claim 2 further characterized in that the conjunct polymer mixture is reacted with hydrogen in the presence of water and an organic peroxidic compound.

CARL B. LINN.

REFERENCES CITED

The following references are of record in the file of this patent:

UNITED STATES PATENTS

| Number | Name | Date |
|---|---|---|
| 2,057,996 | Bayer | Oct. 20, 1936 |
| 2,418,023 | Frey | Mar. 25, 1947 |
| 2,446,998 | Burk | Aug. 17, 1948 |
| 2,470,894 | Johnstone | May 24, 1949 |